United States Patent [19]

Rickert

[11] 4,181,695

[45] Jan. 1, 1980

[54] EMBEDDED BODY IN SOAP

[76] Inventor: Glenn E. Rickert, Community State Bank Bldg., Huntington, Ind. 46750

[21] Appl. No.: 867,919

[22] Filed: Jan. 9, 1978

[51] Int. Cl.[2] .............................................. B29C 17/14

[52] U.S. Cl. ...................................... 264/150; 252/92; 264/148; 264/154; 264/155; 264/249

[58] Field of Search ............... 264/155, 273, 154, 150, 264/148, 249; 252/92; 29/465

[56] References Cited

U.S. PATENT DOCUMENTS

| | | | |
|---|---|---|---|
| 1,636,709 | 7/1927 | Schmidt | 264/259 |
| 1,876,021 | 9/1932 | Quigley | 29/465 |

FOREIGN PATENT DOCUMENTS

| | | | |
|---|---|---|---|
| 2316370 | 10/1974 | Fed. Rep. of Germany | 252/92 |
| 666987 | 10/1929 | France | 252/92 |
| 763889 | 12/1956 | United Kingdom | 252/92 |

*Primary Examiner*—James H. Derrington

*Attorney, Agent, or Firm*—Gust, Irish, Jeffers & Rickert

[57] ABSTRACT

A method is disclosed to embed a perforated body in a cake of soap and to align that body perforation with a transverse hole in the soap so that a support post can easily penetrate the body hole to support the soap by the embedded body.

The flat sheet like body is inserted edgewise into bar soap through a slot in the soap created during the soap extrusion. The problem of aligning the hole in the body with the hole in the soap during the high speed production of cake soap is overcome by first placing the body in the soap at the desired location within a distance of one half the diameter of the hole in the body. The final exact location of the body hole is achieved by a pointed punch creating a hole in the soap by the point on the punch picking up the body hole and shifting the body as needed by a corresponding sized portion of the punch entering the body hole.

10 Claims, 3 Drawing Figures

EMBEDDED BODY IN SOAP

BACKGROUND OF THE INVENTION

This invention relates to cake soap containing a relatively insoluble embedded body.

Several patents exist showing an embedded body in soap. Few if any of these patents, however, disclose a method to get the body into the soap during its manufacture. Present day cake or bar soap is manufactured on special high speed production machines. To add an embedded body to the soap made on such machines is very difficult without greatly reducing the volume output from such a machine or without increasing the number of workers required to operate the machine, either of which increases the cost of the soap.

One object of this invention is to provide a method to insert a special body into soap with a minimum increase in soap production costs.

Another object of the invention is to provide a transverse hole in bar soap which connects to and aligns with a hole in the embedded body.

An important object of the invention is to embed a body in the soap which is sufficiently large as to discourage a child from trying to swallow it.

It is a salient object of the invention to embed a body in the soap so that the soap does not crack open or the body otherwise become loose or come out of the soap.

It is also an object of the invention to embed a body in the soap which will not interfere with using the soap down to the thinnest sliver of soap, and which will even help prevent the soap from breaking when it becomes very thin.

SUMMARY OF THE INVENTION

The foregoing objects as well as several other objects, features and advantages of the present invention are achieved by extruding soap to be made into bars which extrusion has a slot created lengthwise through the extrusion by the extruder head. The extrusion is cut into soap billets, later to be pressed by engraving dies which shape and mark the cake into its final condition.

The embedded body is a relatively insoluble flat sheet like piece having a perforation in it. The body is inserted into the soap billet through a slot created during extrusion and the body hole is positioned in the soap in a two step process.

First the body is positioned in the soap so that the body hole is located within a distance of one-half the diameter of the body perforation. Second a pointed punch having a shaft size about the diameter of the hole is pushed through the soap transversely to the path of entry of the body to create a hole in the soap body at least part way through the soap. The point on the punch penetrates the soap, then enters the body hole and shifts the body as needed by a larger diameter portion of the punch entering the hole in the body. Thus the body hole and the soap hole are connecting and aligned with each other.

With the body hole and the soap hole so aligned, the cake of soap is squeezed to solidly grip the body and hold it in place.

Other objects, features and advantages will appear or be pointed out in the following description.

DESCRIPTION OF THE PREFERRED EMBODIMENT

Figure 1:
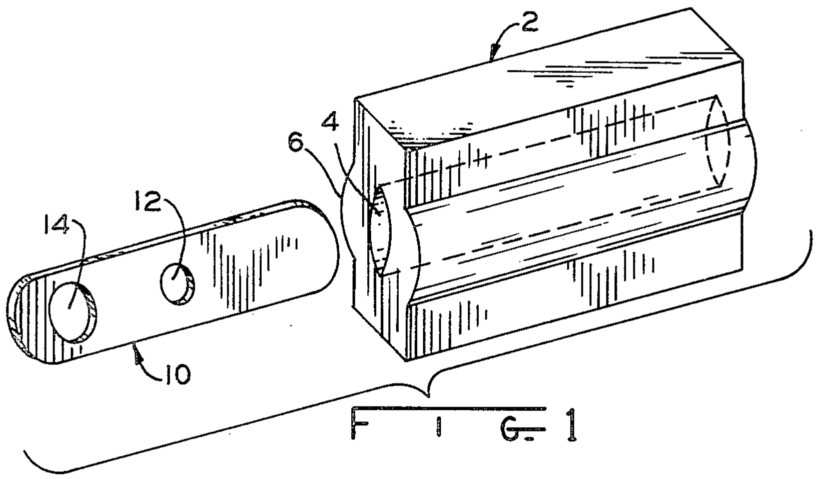
FIG. 1 is an oblique view of a bar of soap having a slot lengthwise to the soap billet made by the extrusion process, and of an adjacent perforated body ready to be inserted into the extruded slot in the soap billet.

In the preferred form and referring to FIG. 1, an extruded bar of soap in billet form has a slot 4 running through the billet. A bulge 6 on the side of the billet can be provided to use as soap material to close and fill the slot area 4 when the finished cake 2 is finally squeezed tightly on the embedded body 10. The body 10 is less soluble than soap and is shown here ready to be inserted on a first axis into the soap 2 slot 4. The body 10 has a perforation 12 which later in the finished cake will be located to connect to and align with a hole in the soap 2. Body 10 has an optional hole 14 which is representative of holes, dimples, or other adaptations and provisions which can be employed to help the soap to grip the body to hold it securely in place.

Figure 2:
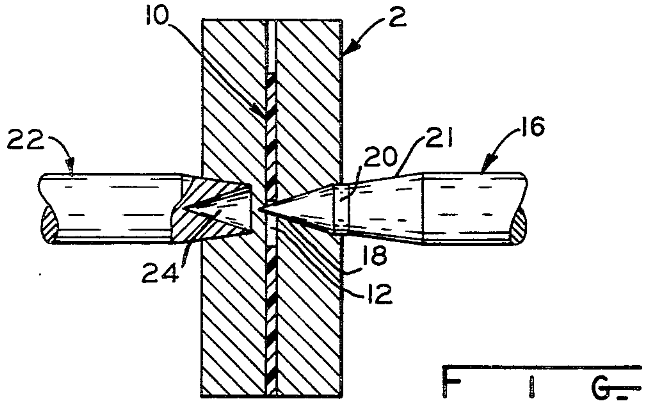
FIG. 2 is a cross-sectional edge view showing a perforated embedded body and a pointed punch entering the soap and body.

FIG. 2 is a view partly in cross-section of the body 10 embedded in the soap 2. The body 10 is shown off center and not quite located in its finished position.

A punch 16 is shown penetrating the soap 2 on a second axis which is transverse to the first axis of insertion of the body 10. The pointed end 18 is shown just entering the body 10 perforation 12. The off center alignment of the perforation 12 and punch 16 point 18 is used to illustrate how the punch or shaft 16 can align the body. As the punch 16 proceeds to pass through the hole 12 the diameter of the punch at 20 being almost the size of the hole 12 causes the body 10 to shift and align the perforation 12 with the hole in the soap created by the optionally straight, or as shown, the enlarged portion 21 of the punch 16. An optional second punch 22 can enter the soap 2 from the opposite side to create a hole all the way through the soap 2 if desired. The punch 22 has an end 24 adapted to meet with end 18 of punch 16 in this form of the invention.

Figure 3:
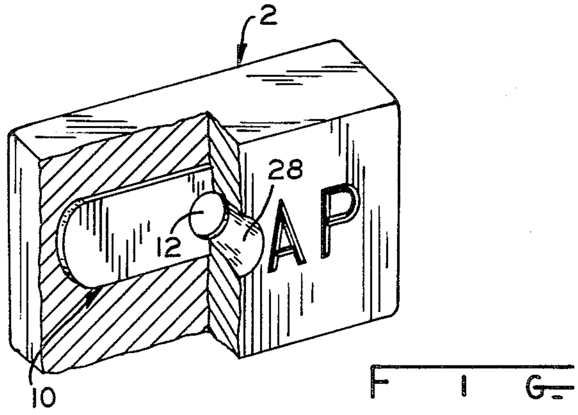
FIG. 3 is an oblique view of a soap billet with a portion of the soap away exposing a perforated embedded body aligned with a hole in the soap.

FIG. 3 is an oblique view of the soap 2 in a finished form. A portion of the soap 2 is cut away to expose the embedded body 10. The body 10 perforation 12 is shown connecting to and aligned with the soap hole 28. The soap hole 28 in the finished soap cake can go all the way through the soap, or can go into the soap to connect to the body 10 perforation 12 but not completely to the opposite side surface. The hole 28 can be somewhat larger in diameter at the outside surfaces of the soap, than at the surface of the embedded body 10 to aid in quick withdrawal of the punches 16 and 22 and for other reasons.

The punch 16, and punch 22 also if desired, can have an air passageway through their center to allow air to quickly enter the hole in the soap as the punches are quickly withdrawn from the soap. A valve system if desired can be employed at the tip end of the punch air passage to close when the punch is entering the soap to keep out soap material and to open when leaving the soap to let air in.

Optionally, the body 10 can be inserted into a billet which has no previously created slot in the soap. The body can be forced into the relatively soft soap and make its own slot as it goes.

A slot of course could be created in the soap before the body is inserted by a tool or blade being pushed into the soap instead of extruding the billet with a slot.

Other shaped bodies, as well as body perforations could, of course, be employed. Also the bodies could be inserted into the edge instead of the end of the soap bar as shown.

The punch 16 can be used to punch the central hole in the soap and locate the body perforation at the time that the soap billet is pressed into shape and engraved with the lines and names normally put on soap, or a pointed punch similar to 16 could be employed at an earlier or later station to punch the soap and locate the body perforation.

The punch 16, of course, could go all the way through the soap itself instead of only about half, as was shown in FIG. 2, in which case the portion 20 size would need to be long enough to reach the opposite surface.

The preferred embodiments of the invention have been illustrated and described, along with several modifications thereon, but other changes and modifications can be made and some features can be used in different combinations without departing from the invention as defined in the claims.

What is claimed is:

1. The process of embedding a perforated body in a piece of soap and of aligning said body perforation with a hole at a predetermined location in the soap that connects to the outside surface of the soap comprising the steps of:

passing a perforated body into a piece of soap along a first axis;

positioning the body perforation inside the soap within a distance of about one half the diameter of said perforation of a predetermined location;

inserting a pointed punch into said soap and the body perforation along a second axis which is transverse to said first axis to more precisely align said body perforation with said predetermined location; and penetrating the soap for the additional purpose of providing a precisely located hole in the soap from the soap surface to the body perforation when the punch is inserted into the soap to align the body perforation with the soap hole.

2. The process of claim 1 including the further step of forming a slot lengthwise in the piece of soap into which the perforated body may be passed.

3. The process of claim 1 wherein the piece of soap is formed by severing pieces from extruded soap material to form billets and includes the step of extruding a slot lengthwise of the soap billets in the direction of extrusion to form a perforated body accepting slot in the soap billets.

4. The process of claim 1 comprising the further step of closing the opening along which the perforated body was passed into the piece of soap to thereby retain the perforated body within the piece of soap.

5. The process of claim 1 wherein the step of inserting includes forming the soap piece surface to a desired contour.

6. The process of embedding a perforated body in a piece of soap and of aligning said body perforation with a hole at a predetermined location in the soap that connects to the outside surface of the soap comprising the steps of:

passing a perforated body into a piece of soap along a first axis;

positioning the body perforation inside the soap within a distance of about one half the diameter of said perforation of a predetermined location; and inserting a pointed punch into said soap and the body perforation along a second axis which is transverse to said first axis by moving the pointed punch relative to a mating punch die with the pointed punch and mating die disposed on opposite sides of the pieces of soap, the pointed punch and punch die being moved toward one another and into engagement to accurately position the perforated body within the piece of soap.

7. The process of claim 6 including the further step of forming a slot lengthwise in the piece of soap into which the perforated body may be passed.

8. The process of claim 6 wherein the piece of soap is formed by severing pieces from extruded soap material to form billets and includes the step of extruding a slot lengthwise of the soap billets in the direction of extrusion to form a perforated body accepting slot in the soap billets.

9. The process of claim 6 comprising the further step of closing the opening along which the perforated body was passed into the piece of soap to thereby retain the perforated body within the piece of soap.

10. The process of claim 6 wherein the step of inserting includes forming the soap piece surface to a desired contour.

* * * * *